United States Patent
Seo et al.

(10) Patent No.: US 11,833,804 B2
(45) Date of Patent: Dec. 5, 2023

(54) VISIBILITY IMPROVING FILM FOR DISPLAY PANEL AND DISPLAY DEVICE COMPRISING SAME

(71) Applicant: LG CHEM, LTD., Seoul (KR)

(72) Inventors: Kwangseok Seo, Daejeon (KR); Hanna Lee, Daejeon (KR); Jinseok Byun, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 812 days.

(21) Appl. No.: 16/763,485

(22) PCT Filed: Nov. 28, 2018

(86) PCT No.: PCT/KR2018/014842
§ 371 (c)(1),
(2) Date: May 12, 2020

(87) PCT Pub. No.: WO2019/107924
PCT Pub. Date: Jun. 6, 2019

(65) Prior Publication Data
US 2020/0301195 A1    Sep. 24, 2020

(30) Foreign Application Priority Data

Nov. 28, 2017    (KR) .................. 10-2017-0160637
Nov. 27, 2018    (KR) .................. 10-2018-0148332

(51) Int. Cl.
| | | |
|---|---|---|
| *B32B 7/023* | (2019.01) | |
| *G02B 1/14* | (2015.01) | |
| *B32B 27/24* | (2006.01) | |
| *B32B 27/26* | (2006.01) | |
| *B32B 27/30* | (2006.01) | |
| *G02B 1/04* | (2006.01) | |
| *G02F 1/1335* | (2006.01) | |
| *B32B 17/10* | (2006.01) | |
| *G02B 1/111* | (2015.01) | |
| *G02B 5/02* | (2006.01) | |

(52) U.S. Cl.
CPC .............. *B32B 7/023* (2019.01); *B32B 17/10* (2013.01); *B32B 27/24* (2013.01); *B32B 27/26* (2013.01); *B32B 27/30* (2013.01); *G02B 1/04* (2013.01); *G02B 1/111* (2013.01); *G02B 1/14* (2015.01); *G02B 5/0242* (2013.01); *G02F 1/133502* (2013.01); *B32B 2255/10* (2013.01); *B32B 2264/105* (2013.01); *B32B 2264/1021* (2020.08); *B32B 2264/303* (2020.08); *B32B 2307/406* (2013.01); *B32B 2307/536* (2013.01); *B32B 2457/20* (2013.01); *G02F 2201/38* (2013.01)

(58) Field of Classification Search
None
See application file for complete search history.

(56) References Cited

U.S. PATENT DOCUMENTS

| | | |
|---|---|---|
| 2004/0114248 A1 | 6/2004 | Hokazono et al. |
| 2009/0002323 A1 | 1/2009 | Shiroishi et al. |
| 2009/0231713 A1 | 9/2009 | Takada |
| 2014/0254020 A1 | 9/2014 | Sakajiri et al. |
| 2015/0116648 A1 | 4/2015 | Shin et al. |
| 2017/0351009 A1 | 12/2017 | Matsuo et al. |
| 2018/0180982 A1 | 6/2018 | Yamaki et al. |
| 2018/0194912 A1 | 7/2018 | Kim et al. |
| 2018/0230317 A1 | 8/2018 | Seo et al. |
| 2018/0292582 A1 | 10/2018 | Matsuo et al. |
| 2018/0313978 A1 | 11/2018 | Chang et al. |
| 2018/0348411 A1 | 12/2018 | Yamaki et al. |
| 2019/0224942 A1 | 7/2019 | Matsuo et al. |

FOREIGN PATENT DOCUMENTS

| | | | |
|---|---|---|---|
| CN | 104736591 A | * 6/2015 | .......... C08G 59/306 |
| EP | 3385787 A1 | 10/2018 | |
| JP | 2007-188100 A | 7/2007 | |
| JP | 2009-217065 A | 9/2009 | |
| JP | 2010-269504 A | 12/2010 | |
| JP | 2014-038362 A | 2/2014 | |
| KR | 10-2006-0123202 A | 12/2006 | |
| KR | 10-2009-0097807 A1 | 9/2009 | |
| KR | 10-2012-0077917 A | 7/2012 | |
| KR | 10-2015-0057474 A | 5/2015 | |
| KR | 10-1562026 B1 | 10/2015 | |
| KR | 10-2017-0031640 A | 3/2017 | |
| KR | 10-2017-0036624 A | 4/2017 | |

(Continued)

OTHER PUBLICATIONS

Machine translation of JP WO 2016/204009 A1, Dec. 22, 2016 (Year: 2016).*
Matsuo, WO 2016204009, Dec. 2016 (machine translation) (Year: 2016).*
Morita, CN-104736591-A, Jun. 2015 (machine translation) (Year: 2015).*
Chang, WO-2017043948-A1, Mar. 2017 (machine translation) (Year: 2017).*
International Search Report Issued for International Application No. PCT/KR2018/014842 dated Mar. 8, 2019, 6 pages.

(Continued)

*Primary Examiner* — Cheng Yuan Huang
(74) *Attorney, Agent, or Firm* — ROTHWELL, FIGG, ERNST & MANBECK, P.C.

(57) ABSTRACT

The present invention relates to a visibility improving film for a display panel, and a display device including the same. More specifically, the present invention relates to a visibility improving film for a display panel capable of having low reflection properties and exhibiting excellent optical and physical properties, particularly while enhancing the visibility of a laser pointer, by including fine metal particles dispersed in the photocurable resin layer, and a display device including the same.

11 Claims, No Drawings

(56) References Cited

FOREIGN PATENT DOCUMENTS

| | | |
|---|---|---|
| KR | 10-2017-0106902 A | 9/2017 |
| KR | 10-2018-0111345 A | 10/2018 |
| TW | 200951482 A | 12/2009 |
| WO | 2016-104112 A1 | 6/2016 |
| WO | 2016-203915 A1 | 12/2016 |
| WO | 2016-204009 A1 | 12/2016 |
| WO | WO-2017043948 A1 * | 3/2017 .............. C08F 12/20 |
| WO | 2017-094550 A1 | 6/2017 |
| WO | 2018-012433 A1 | 1/2018 |

OTHER PUBLICATIONS

Extended European Search Report dated Nov. 23, 2020, of the corresponding European Patent Application No. 18882720.8, 9 pages.

Anonymous: "Luminance—Wikipedia, the free encyclopedia", Feb. 19, 2016, 3 pages.

Bruno Ameduri, Fluoropolymers: The Right Material for the Right Applications, Chemistry A European Journal, vol. 24, Issue 71, Dec. 17, 2018, pp. 18830-18841, DOI:10.1002/chem.201802708.

\* cited by examiner

VISIBILITY IMPROVING FILM FOR DISPLAY PANEL AND DISPLAY DEVICE COMPRISING SAME

CROSS-REFERENCE TO RELATED APPLICATION(S)

This application is a 35 U.S.C. 371 National Phase Entry Application from PCT/KR2018/014842 filed on Nov. 28, 2018, designating the United States and which claims the benefits of filing dates of Korean Patent Application No. 10-2017-0160637 filed with Korean Intellectual Property Office on Nov. 28, 2017, and Korean Patent Application No. 10-2018-0148332 filed with Korean Intellectual Property Office on Nov. 27, 2018, the entire contents of which are incorporated herein by reference.

TECHNICAL FIELD

The present invention relates to a visibility improving film for a display panel and a display device including the same. More specifically, the present invention relates to a visibility improving film for a display panel capable of exhibiting low reflection properties and exhibiting excellent optical and physical properties, particularly while enhancing the visibility of a laser pointer, by including fine metal particles having a specific size and shape, and a display device including the same.

BACKGROUND OF THE INVENTION

For a presentation in, for example, lectures, conferences, or announcements, it is common for material images to be reproduced using a display device and for the presenter to give a presentation while pointing to a screen or the like using a laser pointer at a certain position on a presentation image.

Conventionally, the presentation is often performed by projecting material images on a screen or wall using a beam projector. However, in the case of the projector system, there are disadvantages in that the contrast ratio and image quality are not good. Recently, a high number of large-sized display panels with various driving methods such as LCDs, PDPs, and OLEDs have been supplied, and thereby it is becoming possible to make presentations by displaying images directly on the displays.

However, the display device has light emission characteristics, and there is no factor that can scatter the laser light in addition to specular reflection at a specific angle. This causes a problem in that the visibility of the laser pointer is remarkably deteriorated.

Therefore, there is still a need to develop a method for enhancing the visibility of a laser pointer in a display device without requiring excessive additional steps.

BRIEF DESCRIPTION OF THE INVENTION

The present invention provides a visibility improving film for a display panel capable of exhibiting excellent low reflection properties while enhancing the visibility of a laser pointer at a low cost in a display panel such as an LCD, a PDP, and an OLED, and a display device including the same.

The present invention provides a visibility improving film for a display panel, including:
a substrate;
a photocurable resin layer that is provided on at least one side of the substrate and in which fine metal particles with an average particle size of 0.5 to 5 μm are dispersed; and
a low refractive layer that is formed on the photocurable resin layer,
wherein a relative visibility evaluation value represented by the following Formula 1 is 3 or more,
an average reflectance value in a wavelength region of 380 to 780 nm is 4% or less, and
transmittance measured according to JIS K 7361 is 80% or more.

$$\text{Visibility Evaluation Value} = B1/A1 \quad \text{[Formula 1]}$$

In the above Formula 1,
A1 is a luminance value measured from the front side, when a film having transmittance of 70% to 100% as measured according to JIS K 7361 and a haze value of 20 to 25 as measured according to JIS K 7136 is bonded to a glass slide, then placed on a black acrylic plate and irradiated with laser light at 45° with respect to the normal direction, and
B1 is a luminance value measured from the front side, when the visibility improving film for a display panel is bonded to a glass slide, then placed on a black acrylic plate and irradiated with the same laser light at 45° with respect to the normal direction.

The present invention also provides a display device including a display panel and the above-mentioned visibility improving film for the display panel.

Advantageous Effects

The visibility improving film for a display panel according to the present invention can remarkably enhance the visibility of a laser pointer, which is deteriorated on a display device.

In addition, such an effect can be obtained by applying it in the form of a film to the outside of the display panel without changing the display driving method, the color filter inside the panel, the laminated structure, or the like, and therefore production costs can be reduced since excessive process modification or cost increases are not required.

DETAILED DESCRIPTION OF THE INVENTION

The visibility improving film for a display panel according to the present invention includes:
a substrate;
a photocurable resin layer that is provided on at least one side of the substrate and in which fine metal particles with an average particle size of 0.5 to 5 μm are dispersed; and
a low refractive layer that is formed on the photocurable resin layer,
wherein a relative visibility evaluation value represented by the following Formula 1 is 3 or more,
an average reflectance value in a wavelength region of 380 to 780 nm is 4% or less, and
transmittance measured according to JIS K 7361 is 80% or more.

$$\text{Visibility Evaluation Value} = B1/A1 \quad \text{[Formula 1]}$$

In the above Formula 1,
A1 is a luminance value measured from the front side, when a film having transmittance of 70% to 100% as measured according to JIS K 7361 and a haze value of 20 to 25 as measured according to JIS K 7136 is bonded to a glass slide, then placed on a black acrylic plate and irradiated with laser light at 450 with respect to the normal direction, and B1 is a luminance value measured from the front side, when the visibility improving film for a display panel is bonded to a glass slide, then placed on a black acrylic plate and irradiated with the same laser light at 45° with respect to the normal direction.

In addition, the display device of the present invention includes a display panel and the above-mentioned visibility improving film for the display panel.

In the present invention, the term "upper surface" means a surface arranged to face a viewer when the film is mounted on a display panel, and the term "upper" means a direction toward the viewer. Conversely, the term "lower surface" or "lower" means a surface or a direction arranged to face a side opposite to a viewer when the film is mounted on a display panel.

Further, the terms used herein are used only to explain illustrative examples, and are not intended to limit the invention. A singular expression includes a plural expression unless clearly meaning otherwise. It should be understood that the terms "comprise", "include", and "have" as used herein are intended to designate the presence of stated features, numbers, steps, constitutional elements, or combinations thereof, but it should be understood that they do not preclude the possibility of existence or adding of one or more other features, numbers, steps, constitutional elements, or combinations thereof.

Since a variety of modification may be made to the present invention and there may be various forms of the present invention, specific examples are illustrated and will be described in detail below. However, it should be understood that this is not intended to limit the present invention to particular forms disclosed herein, and the invention compasses all modifications, equivalents, or alternatives falling within the spirit and technical scope of the present invention.

Hereinafter, the visibility improving film for a display panel and the display device including the same according to embodiments of the present invention will be described in more detail.

According to one embodiment of the present invention, a visibility improving film for a display panel is provided, including:

a substrate;

a photocurable resin layer that is provided on at least one side of the substrate and in which fine metal particles with an average particle size of 0.5 to 5 μm are dispersed; and a low refractive layer that is formed on the photocurable resin layer, wherein a relative visibility evaluation value represented by the following Formula 1 is 3 or more, an average reflectance value in a wavelength region of 380 to 780 nm is 4% or less, and transmittance measured according to JIS K 7361 is 80% or more.

$$\text{Visibility Evaluation Value} = B1/A1 \quad \text{[Formula 1]}$$

In the above Formula 1,

A1 is a luminance value measured from the front side, when a film having transmittance of 70% to 100% as measured according to JIS K 7361 and a haze value of 20 to 25 as measured according to JIS K 7136 is bonded to a glass slide, then placed on a black acrylic plate and irradiated with laser light at 45° with respect to the normal direction, and B1 is a luminance value measured from the front side, when the visibility improving film for a display panel is bonded to a glass slide, then placed on a black acrylic plate and irradiated with the same laser light at 45° with respect to the normal direction.

The visibility improving film for a display panel formed by using the coating composition according to the present invention can exhibit characteristic refractive and/or scattering properties with respect to light in a wavelength range used for a laser pointer, and thus can contribute to improvement of the visibility of the laser pointer.

Such a visibility improving film for a display panel includes a cured product of a binder containing a photocurable functional group, and fine metal particles that are dispersed in the photocurable binder.

Commonly used films for display panels include at least one substrate selected from the group consisting of glass, a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), poly(methylmethacrylate) (PMMA), polyether ether ketone (PEEK), polyethylene naphthalate (PEN), polyetherimide (PEI), polyimide (PI), MMA (methyl methacrylate), a fluorocarbon resin, triacetylcellulose (TAC), and the like.

Among these substrates, triacetylcellulose (TAC) films are particularly excellent in optical properties and thus are frequently used.

According to one embodiment of the invention, the photocurable resin layer may be formed on one side or both sides of the substrate. In particular, when the photocurable resin layer is formed so as to be on the side of the upper portion of the substrate, that is, in the direction of the viewer, the photocurable resin layer can also serve as a hard coating layer.

According to one embodiment of the invention, the photocurable resin layer is formed by using a coating composition capable of coating and ultraviolet-curing on a substrate.

The coating composition for producing the visibility improving film for a display panel of the present invention may include: a binder containing a photocurable functional group; fine metal particles dispersed in the binder and having an average particle size of 0.5 to 5 μm; a photopolymerization initiator, solvents, etc.

The binder containing the photo-curable functional group is not particularly limited as long as it is a compound containing an unsaturated functional group capable of causing a polymerization reaction by ultraviolet rays, but it may be a compound containing a (meth)acrylate group, an allyl group, an acryloyl group, or a vinyl group as the photocurable functional group. According to one embodiment of the invention, the binder containing the photo-curable functional group may be at least one selected from the group consisting of a multifunctional acrylate-based monomer, a multifunctional acrylate-based oligomer, and a multifunctional acrylate-based elastic polymer.

In the present invention, the acrylate-based refers not only to acrylates, but also to methacrylates, or derivatives of acrylates or methacrylates having substituents introduced therein.

The multifunctional acrylate-based monomer means a monomer containing two or more acrylate-based functional groups. More specific examples thereof may include hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerin propoxylated triacrylate (GPTA), pentaerythritol tri(tetra)acrylate (PETA), dipentaerythritol hexaacrylate (DPHA), or the like, but the coating composition of the present invention is not limited thereto. The multifunctional acrylate-based monomer performs a role of providing certain pencil strength and abrasion resistance to the film by being cross-linked.

The multifunctional acrylate-based monomer may be used either alone or as a combination of different types.

The multifunctional acrylate-based oligomer is an oligomer having two or more acrylate functional groups, and may have a weight average molecular weight in a range of about 1000 to about 10,000 g/mol, about 1000 to about 5000 g/mol, or about 1000 to about 3000 g/mol.

Further, according to one embodiment of the present invention, the multifunctional acrylate-based oligomer may be an acrylate-based oligomer modified with one or more types of urethane, ethylene oxide, propylene oxide, and caprolactone. When using the modified multifunctional acrylate-based oligomer, flexibility is further imparted to the multifunctional acrylate-based oligomer due to modification and thus a curl property and flexibility of a protective film can be increased.

The multifunctional acrylate-based oligomer may be used either alone or as a combination of different types.

The multifunctional acrylate-based elastic polymer is excellent in flexibility and elasticity, and is a polymer containing two or more acrylate functional groups, which may have a weight average molecular weight ranging from about 100,000 to about 800,000 g/mol, from about 150,000 to about 700,000 g/mol, or from about 180.000 to about 650,000 g/mol.

A protective film formed by using a coating composition including the multifunctional acrylate-based elastic polymer may secure high elasticity or flexibility while securing mechanical properties, and may minimize curl or crack occurrences.

Another example of the multifunctional acrylate-based elastic polymer may include a urethane-based acrylate polymer. The urethane-based acrylate polymer has a form of a urethane-based acrylate oligomer being linked to an acrylic polymer main chain as a side branch.

Meanwhile, according to one embodiment of the present invention, the coating composition can exhibit light scattering properties of a laser pointer by including fine metal particles. When the coating composition includes fine metal particles, the photocurable resin layer cured by using this can effectively scatter laser light used for the laser pointer, thereby enhancing visibility.

Generally, when producing a film or the like for a display panel, inorganic fine particles such as organic particles or metal oxides are often used in the coating composition or the like. This is because the corresponding particles have high transmittance.

Such transmissive particles and the like cause light scattering mainly by refraction and diffraction, while the metal particles reflect light. More specifically, in the case of the transmissive particles, light scattering due to diffraction and refraction occurs consecutively along the path along which the light travels. Consequently, the light spreads and cloudy light appears. However, in the case of metal particles, since light scattering occurs due to reflection without transmitting light, light scattering does not occur consecutively along the path along which the light travels, and the light spreading phenomenon does not occur.

In particular, when metal oxide-based inorganic particles such as titanium dioxide ($TiO_2$) particles having a large difference in refractive index from the binder are used, a high light scattering effect can be obtained, but there is a disadvantage that the contrast ratio is greatly lowered due to high transmittance of the particles.

The contrast ratio of the display device is caused by the difference between the luminance of the image coming from the display panel and the luminance difference due to the film. In the case of using the transmissive particles, the luminance in the film is increased by the particles, and eventually, the difference in luminance between the panel and film becomes low and thus the contrast ratio is lowered.

Therefore, the film for a display panel according to the embodiment of the present invention can enhance the visibility of laser pointer light by using the fine metal particles, and at the same time, realize a high contrast ratio.

The average particle size of the fine metal particles may be about 0.5 μm or more from the viewpoint of optimizing the light scattering effect, and it can be a particle with a size of 5 μm or less, more preferably about 0.5 to about 3 μm, or about 1 to about 3 μm from the viewpoint of making the haze and coating thickness appropriate.

When the average particle size of the fine metal particles is too small, the effect of enhancing the visibility of a laser pointer light due to scattering of light may be insignificant, and when the average particle size of the fine metal particles is too large, a protrusion is formed on the surface of the film, which may cause a decrease in optical properties such as transparency and transmittance.

The average particle size of the fine metal particles can be determined by confirming the particle sizes of the entire fine metal particles contained in the resin layer. The particle size of the fine metal particles can be confirmed by the cross-section of the resin layer or the like. Further, the average particle size of the fine particles can be confirmed through the particle sizes of all the fine metal particles or their average particle sizes used in the production of the resin layer.

The fine metal particles may be a group of individual fine particles having an average particle size of 0.5 to 5 μm, and the individual fine particles contained in this group may have a particle size of 0.1 to 25 μm. More specifically, 95% or 99% of the individual fine particles contained in the group may have a particle size of 0.1 to 25 μm.

More specific examples of metals satisfying these conditions include one or more metals selected from the group consisting of aluminum, gold, silver, magnesium, platinum, copper, titanium, zirconium, nickel, tin, and chromium, or an alloy thereof, but the present invention is not necessarily limited thereto.

According to one embodiment of the present invention, when the total weight of the binder containing a photocurable functional group is taken as 100 parts by weight, the fine metal particles may be contained in an amount of about 0.5 to about 15 parts by weight, preferably about 1 to about 15 parts by weight, or about 1 to about 10 parts by weight.

When the fine metal particles are contained in an excessively small amount, the light reflection effect at the corresponding wavelength is insignificant and thus the effect of enhancing the visibility of the laser pointer may not be sufficient. When the fine metal particles are contained in an excessively large amount, color reproducibility and luminance of the display device may be lowered, and other physical properties of the coating composition may be deteriorated. In this respect, it is preferable to be included in the above range.

In this case, the fine metal particles are spherical particles having a number average particle size of 0.5 to 5 μm and a flattening ratio of about 0.5 or less.

The "flattening ratio" is referred to as ellipticity, and is the amount indicating the degree of flatness of a three-dimensional rotating ellipsoid. It is a value represented by (a-b)/a when the long diameter is a and the short radius is b. The flattening ratio of a sphere is 0, and the flattening ratio of a plane is 1.

When the value of the flattening ratio is too large (in the case of plate-like particles), the light reflection/scattering due to the metal particles inside the film excessively occurs, and it cannot be suitable for display film applications due to the sparkling appearance and this may cause a problem that the white turbidity increases and thus the contrast ratio is lowered.

In this respect, it is more preferable that the value of the flattening ratio of the fine metal particles used in the present invention is about 0.3 or less.

Meanwhile, these fine metal particles may be used alone, but when mixed in the photocurable resin layer, it may be more preferable to use them in a form in which they are previously dispersed in the dispersion in terms of enhancing the dispersibility.

Examples of the photo-polymerization initiator contained in the coating composition of the present invention may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methyl benzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, bis(2,4,6-trimethylbenzoyl)-phenylphosphine oxide, and the like. In addition, examples of products now commercially available may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, or the like. These photo-polymerization initiators may be used alone or in combination of two or more kinds.

According to one embodiment of the present invention, the content of the photo-polymerization initiator is not particularly limited, but it may be used in an amount of about 0.1 to about 10 parts by weight, based on 100 parts by weight of the total weight of the binder containing the photocurable functional group, without deteriorating physical properties of the total coating composition.

The organic solvent contained in the coating composition of the present invention may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methyl ethyl ketone, methyl isobutyl ketone, methyl propyl ketone, and cyclohexanone; an ether solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, and diethylene glycol-2-ethylhexyl ether; and an aromatic solvent such as benzene, toluene, and xylene, and they may be used alone or in combination thereof.

According to one embodiment of the present invention, the content of the organic solvent may be variously adjusted within a range that does not deteriorate the physical properties of the coating composition, but the organic solvent may be used in an amount of about 50 to about 200 parts by weight, preferably about 100 to about 200 parts by weight, based on 100 parts by weight of the binder containing the photocurable functional group. When the amount of organic solvent is within the above ranges, it may exert appropriate fluidity and coatability.

Meanwhile, the coating composition of the present invention may further include an additive commonly used in the art to which the present invention pertains, such as a surfactant, an antioxidant, a UV stabilizer, a leveling agent, or an antifouling agent, in addition to the above-described components. Here, the content thereof may be variously adjusted within a range that does not deteriorate the physical properties of the coating composition of the present invention. Thus, there is no particular limitation thereto, but for example, it may be included in an amount of about 0.1 to about 10 parts by weight based on 100 parts by weight of the total coating composition.

Meanwhile, according to one embodiment of the present invention, it may be preferable that the coating composition further includes silica fine particles having an average particle size of 0.5 to 5 μm.

When the coating composition includes silica fine particles, the photocurable resin layer cured by using them can add the effect of reducing the specular reflection from the film surface due to laser light used for the laser pointer.

The average particle size of the fine silica particles may be 0.5 μm or more from the viewpoint of optimizing the light scattering effect, and it can be a particle with a size of 5 μm or less from the viewpoint of making the haze and coating thickness appropriate.

The average particle size of the fine silica particles can be determined by confirming the particle sizes of the entire fine metal particles contained in the resin layer. The particle size of the fine silica particles can be confirmed by the cross-section of the resin layer formed by the coating composition or the like. Further, the average particle size of the fine silica particles can be confirmed even through the particle sizes of all the fine silica particles or their average particle sizes used in the production of the resin layer.

The fine silica particles may be a group of individual fine particles having an average particle size of 0.5 to 5 μm, and the individual fine particles contained in this group may have a particle size of 0.1 to 25 μm. More specifically 95% or 99% of the individual fine particles contained in the group may have a particle size of 0.1 to 25 μm.

When the average particle size of the fine silica particles is too small, it is difficult to sufficiently realize external irregularities, and when the average particle size is too large, it is problematic that the haze is increased.

The fine silica particles can be used without limitation in the constitution as long as they are a type used for forming the anti-glare film.

The total content of the fine silica particles may be in the rage of about 1 to about 50 parts by weight, preferably about 3 to about 30 parts by weight, more preferably about 5 to about 15 parts by weight, based on 100 parts by weight of the binder containing the photocurable functional group.

When the total content of the fine silica particles is too small, the external scattering due to surface irregularities is not sufficiently realized. When the content is too high, the viscosity of the coating composition is increased, the coating property becomes poor, and the haze value due to external scattering becomes too large, and thus the contrast ratio may be lowered.

The visibility improving film for a display panel of the present invention as described above can be formed by coating a coating composition onto a substrate and photocuring the coating composition.

Specific descriptions and examples of the coating composition and each component constituting the composition are the same as described above.

The method of coating the coating composition is not particularly limited as long as it may be used in the art to which the present technology belongs. For example, a bar coating method, a knife coating method, a roll coating method, a blade coating method, a die coating method, a microgravure coating method, a comma coating method, a slot die coating method, a lip coating method, a solution casting method, or the like may be used.

Next, a protective film may be formed by carrying out a photocuring reaction through irradiating ultraviolet rays on the coated composition. The coated surface of the composition is flattened before irradiating the ultraviolet rays, and a drying step for volatizing a solvent included in the composition may be further carried out.

The amount of the ultraviolet irradiation may be, for example, from about 20 to about 600 mJ/cm$^2$. The light source of the ultraviolet irradiation is not particularly limited as long as it is capable of being used in the art, and examples thereof may include a high pressure mercury lamp, a metal halide lamp, a black light fluorescent lamp, and the like.

Further, the visibility improving film for a display panel according to an embodiment of the present invention includes a low refractive layer that is formed on the photocurable resin layer described above.

The low refractive layer realizes the antireflection effect in the existing display panel film, thereby further enhancing the visibility. On the other hand, as specular reflection is prevented when using a laser pointer, the laser pointer light is specularly reflected, thereby effectively preventing it from directly entering the eye of a viewer viewing the image.

Such a low refraction layer can follow the structure of a general low reflective layer or an anti-reflective layer previously used in a film for a display device, an optical film for a polarizing plate, or the like. Specifically, for example, an antireflection layer or an antireflection coating using interference of light by forming a plurality of layers having different refractive indexes can be used without particular limitation.

In particular, such a low refractive layer is formed by a coating composition for a low refractive layer including:
a photopolymerizable compound; and
any one or more of a fluorine-containing compound containing a photoreactive group, and a silicon-based compound containing a photoreactive group,
wherein the average reflectance value in the wavelength range of 380 to 780 nm is 4% or less, preferably less than about 3%, or less than about 1%.

Accordingly, the binder resin of the low refractive layer may include a (co)polymer of the photopolymerizable compound, and a cross-linked (co)polymer between a fluorine-containing compound containing a photoreactive group and/or a silicon-based compound containing a photoreactive group.

More specifically, the photopolymerizable compound may include a monomer or an oligomer containing one or more, two or more, or three or more of (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers is preferably 1000 to 10,000.

Specific examples of the monomer or oligomer containing a vinyl group include divinylbenzene, styrene, and para-methyl styrene.

The content of the photopolymerizable compound in the coating composition for a low refractive layer is not particularly limited. However, considering the mechanical properties of the finally produced low refractive layer and the visibility improving film for a display panel, the content of the photopolymerizable compound in the solid content of the photocurable coating composition may be 5% by weight to 80% by weight. The solid content of the coating composition for a low refractive layer refers only to the solid components excluding the liquid components in the photocurable coating composition, for example, organic solvents, which may be optionally included as described below.

The fluorine-containing compound containing a photoreactive group may include or be substituted with at least one photoreactive functional group, and the photoreactive group refers to a functional group which can participate in a polymerization reaction by irradiation of light, for example, by irradiation of visible light or ultraviolet light. The photoreactive group may include various functional groups known to be able to participate in a polymerization reaction by irradiation of light. Specific examples thereof include a (meth)acrylate group, an epoxide group, a vinyl group, and a thiol group.

The fluorine-containing compound containing the photoreactive group may have a weight-average molecular weight (weight-average molecular weight in terms of polystyrene measured by a GPC method) of 2000 to 200,000, preferably 5000 to 100,000.

When the weight-average molecular weight of the fluorine-containing compound containing the photoreactive group is too small, in the photocurable coating composition, the fluorine-containing compounds may not be uniformly and effectively arranged on the surface and may be positioned at the inside of the finally produced low refractive layer, and thus the anti-fouling property of the surface of the low refractive layer may be deteriorated and the crosslinking density of the low refractive layer may be lowered, thus deteriorating mechanical properties such as total strength, scratch resistance, etc.

Further, if the weight average molecular weight of the fluorine-containing compound containing the photoreactive functional group is too high, compatibility with other components in the photocurable coating composition may be decreased, and the haze of the finally produced low refractive layer may increase or the light transmittance may be lowered, and the strength of the low refractive layer may also be deteriorated.

Specifically, the fluorine-containing compounds including photoreactive functional groups may include: i) aliphatic compounds or alicyclic compounds substituted with one or more photoreactive groups, in which at least one carbon is substituted with one or more fluorine atoms; ii) heteroaliphatic compounds or heteroaliphatic cyclic compounds substituted with one or more photoreactive groups, in which at least one hydrogen is substituted with fluorine and at least one carbon is substituted with silicon; iii) polydialkyl siloxane-based polymers (for example, a polydimethyl siloxane-based polymer) substituted with one or more photoreactive groups, in which at least one silicon is substituted with one or more fluorine atoms; iv) polyether compounds substituted by one or more photoreactive groups, in which at least one hydrogen is substituted with fluorine; or a mixture of two or more of i) to iv); or a copolymer thereof.

The photocurable coating composition may contain 20 to 300 parts by weight of the fluorine-containing compound containing the photoreactive group based on 100 parts by weight of the photopolymerizable compound.

When the fluorine-containing compound containing the photoreactive group is added in an excess amount relative to the photopolymerizable compound, the coating properties of the photocurable coating composition of the embodiment may be reduced, or the low refractive layer obtained from the photocurable coating composition may not have sufficient durability or scratch resistance. In addition, when the amount of the fluorine-containing compound containing the photoreactive group relative to the photopolymerizable compound is too small, the low refractive layer obtained from the photocurable coating composition may not have sufficient mechanical properties such as antifouling property, scratch resistance, etc.

Further, the silicon-based compound containing the photoreactive group may be polysilsesquioxane having one or more photoreactive groups. In this case, the low refractive layer includes about 0.5 to about 25 parts by weight, or about 1.5 to about 19 parts by weight of the polysilsesquioxane, based on 100 parts by weight of the photopolymerizable compound, thereby providing a low refractive layer capable of simultaneously realizing high alkali resistance and scratch resistance while having low reflectance and high light transmittance.

Specifically, in the polysilsesquioxane as described above, a photoreactive group is present on the surface, and thus the mechanical properties such as scratch resistance of the coating film or the binder resin formed upon photocuring of the photocurable coating compositions may be enhanced. In addition, the siloxane bond (—Si—O—) is positioned inside the molecule, and thus the alkali resistance of the binder resin can be improved, as compared with the case of using fine particles such as silica, alumina, zeolite, or the like, which are known in the past.

Further, the polysilsesquioxane may be represented by $(RSiO1.5)_n$ (where n is 4 to 30 or 8 to 20), and may have various structures such as random, ladder type, cage type, partial cage type, etc.

However, in order to enhance the physical properties and quality of the low refractive layer and the antireflection film produced from the photocurable coating composition of the one embodiment, a polyhedral oligomeric silsesquioxane having a cage structure, in which one or more reactive functional groups are substituted, may be used as the polysilsesquioxane substituted with one or more reactive functional groups.

As at least one of silicons of the polysilsesquioxane is substituted with a photoreactive group, the mechanical properties of the coating film or the binder resin formed upon photocuring may be improved, and furthermore, as remaining silicons are substituted with unreactive functional groups, molecular structural steric hindrance appears, thus significantly lowering the frequency or probability of exposure of the siloxane bond (—Si—O—) to the outside. Thereby, it is possible to enhance the alkali resistance of the coating film or the binder resin formed upon photocuring of the photocurable coating composition.

On the other hand, examples of the polyhedral oligomeric silsesquioxane (POSS) that is substituted with one or more reactive functional groups and has a cage structure may include POSS substituted with one or more alcohols such as TMP diolisobutyl POSS, cyclohexanediol isobutyl POSS, 1,2-propanediollsobutyl POSS, octa(3-hydroxy-3-methylbutyldimethylsiloxy) POSS, etc.; POSS substituted with one or more amines such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS substituted by one or more carboxylic acids such as maleamic acid-cyclohexyl POSS, maleamic acid-isobutyl POSS, octa maleamic acid POSS, etc.; POSS substituted with one or more epoxides such as epoxycyclohexylisobutyl POSS, epoxycyclohexyl POSS, glycidyl POSS, glycidylethyl POSS, glycidylisobutyl POSS, glycidylisooctyl POSS, etc.; POSS substituted with one or more imides such as POSS maleimide cyclohexyl, POSS maleimide isobutyl, etc.; POSS substituted with one or more (meth)acrylates such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; POSS substituted with one or more nitrile groups such as cyanopropylisobutyl POSS, etc.; POSS substituted with one or more norbornene groups such as norbornenylethylethyl POSS, norbornenylethylisobutyl POSS, norbornenylethyl disilanoisobutyl POSS, trisnorbornenyl isobutyl POSS, etc.; POSS substituted with one or more vinyl groups such as allylisobutyl POSS, monovinylisobutyl POSS, octacyclohexenyldimethylsilyl POSS, octavinyldimethylsilyl POSS, octavinyl POSS, etc.; POSS substituted with one or more olefins such as allylisobutyl POSS, monovinylisobutyl POSS, octacyclohexenyldimethylsilyl POSS, octavinyldimethylsilyl POSS, octavinyl POSS, etc.; POSS substituted with C5-30 PEG; POSS substituted by one or more thiol groups such as mercaptopropylisobutyl POSS or mercaptopropylisooctyl POSS, etc.; and the like.

The low refractive layer may contain 10 to 400 parts by weight of the hollow inorganic nanoparticles and 10 to 400 parts by weight of the solid inorganic nanoparticles, based on 100 parts by weight of the (co)polymer of the photopolymerizable compound.

When the contents of the hollow inorganic nanoparticles and the solid inorganic nanoparticles in the low refractive layer are excessively high, the hollow inorganic nanoparticles and the solid inorganic nanoparticles may not be sufficiently phase-separated and mixed during the manufacturing process of the low refractive layer, and thereby, the reflectance may be increased, the surface irregularities are excessively generated, and the anti-fouling property may be lowered. Further, when the contents of the hollow inorganic nanoparticles and the solid inorganic nanoparticles in the low refractive layer are excessively low, it may be difficult for a great number of the solid inorganic nanoparticles to maintain their position in the region close to the interface between the hard coating layer and the low refractive layer, thereby greatly increasing the reflectance of the low refractive layer.

The low refractive layer may have a thickness of about 1 nm to about 300 nm, or about 50 nm to about 200 nm.

The visibility improving film for a display panel of the present invention includes fine metal particles having a specific shape as described above and has a separate low refractive layer, so that it can effectively reflect laser light made incident on the liquid crystal display by means of a laser pointer, and therefore it is possible to provide a display device capable of realizing excellent image quality with high luminance and contrast ratio while enhancing the visibility of a laser pointer.

Specifically, the visibility improving film for a display panel has a relative visibility evaluation value represented by the following Formula 1 of 3 or more.

$$\text{Visibility Evaluation Value} = B1/A1 \qquad \text{[Formula 1]}$$

In the above Formula 1,

A1 is a luminance value measured from the front side, when a film having transmittance of 70% to 100% as measured according to JIS K 7361 and a haze value of 20 to 25 as measured according to JIS K 7136, more preferably a film having transmittance of 90% to 95% and a haze value of 20 to 25, is bonded to a glass slide, then placed on a black acrylic plate and irradiated with a laser light at 450 with respect to the normal direction, and B1 is a luminance value measured from the front side, when the visibility improving film for a display panel is bonded to a glass slide, then placed on a black acrylic plate and irradiated with the same laser light at 45° with respect to the normal direction.

As described above, the visibility improving film for a display panel of the present invention can realize an effect of increasing the luminance by about 50% or more, preferably about 60% or more, relative to the luminance before irradiation, due to the scattering/reflection light by the fine metal particles, as compared with the case of using a general UV curable coating layer, and thereby the visibility of the laser pointer can be remarkably improved.

Further, the visibility improving film for a display panel has an average reflectance value of 4% or less, preferably about 1 to about 4%, in a wavelength region of 380 to 780 nm, and can exhibit excellent effects in enhancing the visibility of the laser pointer light while having excellent low reflection properties.

Further, the visibility improving film for a display panel may have high light transmittance, which is transmittance measured according to JIS K 7361 of 80% or more, preferably about 80% to about 95%.

In an optical film or the like, the transmittance and the haze properties are changed depending on the introduced particles contained in the film. Generally, the greater the amount of the light scattering particles having similar optical properties, the greater the tendency of the transmittance is of being lowered and the haze being increased.

However, depending on the type of particles used, it is possible to have a characteristic relationship between transmittance and haze. In particular, when the fine metal particles are contained in the resin layer, they have the reflection characteristics as described above, and thus can show a lower haze value than that of the organic fine particles or the inorganic oxide fine particles commonly used in the art, while decreasing light transmittance. In particular, when compared with the case of using the transmissive light scattering particles, even if they show the same transmittance value, there is a feature that they can have a relatively low haze value.

In particular, the transmittance value may vary depending on the content of particles. When the transmittance is too high, there is a problem that the amount of particles for scattering or reflecting light is absolutely deficient, thereby failing to realize appropriate visibility. When the transmittance is too low, the visibility is good, but the contrast ratio and luminance are lowered, which may cause a problem that the image quality of the image to be mounted on the display deteriorates.

Therefore, by limiting the range of the above-described transmittance, and the characteristic haze value attributable to the use of specific fine metal particles, it can exhibit excellent visibility in the use of the laser pointer and at the same Lime realize an excellent contrast ratio.

In addition, the visibility improving film for a display panel may have excellent optical properties, for example, may have a value of a luminance ratio represented by the following Formula 2 of about 80 or more, and preferably about 90 to about 105.

$$\text{Luminance Ratio} = (B2/A2)*100 \qquad \text{[Formula 2]}$$

In the above Formula 2,

A2 is a luminance value measured from the front side, when a film having transmittance of 80% to 100% as measured according to JIS K 7361 and a haze value of 20 to 25 as measured according to JIS K 7136, more preferably a film having a transmittance of 90% to 95% and a haze value of 22 to 25, is bonded to a glass slide and then placed on a backlight surface, and B2 is a luminance value measured from the front side, when the visibility improving film for a display panel is bonded to a glass slide and then placed on a backlight surface.

In addition, the visibility improving film for a display panel may have a white turbidity ratio value represented by the following Formula 3 of 5 or less, preferably about 4 or less.

$$\text{White Turbidity Ratio} = B3/A3 \qquad \text{[Formula 3]}$$

In the above Formula 3,

A3 is a luminance value ($cd/m^2$) measured at a height of 7 cm from the front side, when a film having transmittance of 80% to 100% as measured according to JIS K 7361 and a haze value of 20 to 25 as measured according to JIS K 7136 is bonded to a glass slide, then placed on a black acrylic plate and kept under the condition of 9 lx, and B3 is a luminance value ($cd/m^2$) measured at a height of 7 cm from the front side, when the visibility improving film for a display panel is bonded to a glass slide, then placed on a black acrylic plate and kept under the condition of 9 lx.

As described above, the visibility improving film for a display panel of the present invention can greatly enhance the visibility of the laser pointer and at the same time realize an excellent contrast ratio.

According to one embodiment of the resent invention, it may be preferable that the visibility improving film for a display panel of the present invention has a 60(d) gloss value of about 10 to about 50 as measured according to JIS Z 8741.

When the gloss value is satisfied, the laser light made incident on the liquid crystal display by means of a laser pointer can be effectively reflected. Therefore, the specular reflection is limited to a certain extent while enhancing the visibility of the laser pointer, and thereby the laser pointer light is specularly reflected and it is possible to effectively prevent it from directly entering the eye of the observer viewing the image.

In the visibility improving film for a display panel according to the present invention, the substrate on which the resin layer is formed may be glass or a transparent plastic resin which is commonly used for a display panel. More specifically, according to one embodiment of the present invention, the substrate may include a polyester such as polyethylene terephthalate (PET), a polyethylene such as ethylene vinyl acetate (EVA), a cyclic olefin polymer (COP), a cyclic olefin copolymer (COC), polyacrylate (PAC), polycarbonate (PC), polyethylene (PE), poly(methylmethacrylate) (PMMA), polyether ether ketone (PEEK), polyethylene naphthalate (PEN), polyetherimide (PEI), polyimide (PI), MMA (methyl methacrylate), a fluorocarbon resin, triacetylcellulose (TAC), or the like.

Preferably, the substrate may be a film including triacetyl cellulose (TAC).

The thickness of the substrate is not particularly limited, but it is possible to use a substrate having a thickness of about 20 to about 100 μm, or about 20 to about 60 μm, which is within a range capable of satisfying the hardness and other physical properties of the film.

The visibility improving film for a display panel according to the present invention may have pencil hardness of HB or more, 1H or more, or 2H or more, at a load of 500 g.

In addition, when steel wool #0 is attached to a friction tester and then reciprocated 10 times with a load of 200 g, a load of 300 g, or a load of 400 g, it can exhibit scratch resistance such that scratches do not occur.

Meanwhile, according to another embodiment of the present invention, a display device including a display panel and the above-mentioned visibility improving film for the display panel is provided.

In this case, the display panel is not particularly limited to a driving method or structure, and it can be applied to all of LCD panels, PDP panels, and OLED panels.

The visibility improving film for a display panel and the display panel may be adhered through lamination using a separate adhesive and the like. The adhesive capable of being used herein is not particularly limited as long as it is known in the art. Examples thereof may include water-based adhesives, one component or two component polyvinyl alcohol (PVA)-based adhesives, polyurethane-based adhesives, epoxy-based adhesives, styrene butadiene rubber (SBR)-based adhesives, hot melt-type adhesives, or the like, but the present disclosure is not limited to these examples.

Further, the fact that the resin layer may also serve as an adhesive layer is as described above. When the resin layer does not serve as the adhesive layer, the substrate surface on which the resin layer is not formed adheres to the display panel side, and the resin layer is laminated so as to be located toward the outside, and thereby it may be preferable to form a structure for directly facing the surface to which the laser pointer is made incident.

Hereinafter, actions and effects of the present invention will be described in more detail through specific examples, but these examples are given to merely illustrate the invention and are not intended to limit the scope of the invention thereto.

EXAMPLE

Preparation of Coating Composition for Photocurable Resin Layer

Preparation Examples 1 to 4

Pentaerythritol tri(tetra)acrylate (hereinafter referred to as PETA), hexafunctional urethane acrylate (hereinafter referred to as 6 UA), Irgacure 184 as a photopolymerization initiator (hereinafter referred to as the initiator), a polyether siloxane copolymer, T270, as an additive (TEGO, hereinafter referred to as the additive), 2-BuOH (hereinafter referred to as BuOH), and methyl ethyl ketone (hereinafter referred to as MEK) as an organic solvent, and an aluminum particle solution (average particle size: about 1.5 μm; average flattening ratio: 0.3; solid content: 20 wt %; dispersion solvent: toluene) (hereinafter referred to as Al/T) were mixed to prepare a resin composition.

Preparation Examples 5 and 6

Silica (SS-50B and SS-50F, Nipsil series product) was dispersed in toluene to prepare a silica dispersion.

Pentaerythritol tri(tetra)acrylate (hereinafter referred to as PETA), hexafunctional urethane acrylate (hereinafter referred to as 6 UA), Irgacure 184 as a photopolymerization initiator (hereinafter referred to as the initiator), polyether siloxane copolymer, T270, as an additive (TEGO, hereinafter referred to as the additive), 2-BuOH (hereinafter referred to as BuOH), and methyl ethyl ketone (hereinafter referred to as MEK) as an organic solvent, and an aluminum particle solution (average particle size: about 1.5 μm; average flattening ratio: 0.3; solid content: 20 wt %; dispersion solvent: toluene) (hereinafter referred to as Al/T) were mixed and the silica dispersion was added thereto and mixed to prepare a resin composition.

Preparation Example 7

Silica (SS-50B and SS-50F, Nipsil series product) was dispersed in toluene to prepare a silica dispersion (hereinafter referred to as Si/T).

Pentaerythritol tri(tetra)acrylate (hereinafter referred to as PETA), hexafunctional urethane acrylate (hereinafter referred to as 6 UA), Irgacure 184 as a photopolymerization initiator (hereinafter referred to as the initiator), a polyether siloxane copolymer, T270, as an additive (TEGO, hereinafter referred to as the additive), 2-BuOH and methyl ethyl ketone (hereinafter referred to as MEK) as an organic solvent, and $TiO_2$ particles (Chemours, average particle size: 390 nm, solid content: 25 wt %; dispersion solvent: butyl cellosolve) (hereinafter referred to as $TiO_2$) were mixed and the silica dispersion was added thereto and mixed to prepare a resin composition.

The compositions of the Preparation Examples are summarized in Table 1 below.

TABLE 1

| | Preparation Example No. Component | 1 | 2 | 3 | 4 | 5 | 6 | 7 |
|---|---|---|---|---|---|---|---|---|
| Unit: parts by weight | PETA | 22.68 | 22.18 | 20.09 | 19.01 | 17.75 | 16.13 | 17.5 |
| | 6UA | 22.68 | 22.18 | 20.09 | 19.01 | 17.75 | 16.13 | 17.3 |
| | Initiator | 3.5 | 3.43 | 3.1 | 2.94 | 2.74 | 2.49 | 2.5 |

TABLE 1-continued

| Preparation Example No. Component | 1 | 2 | 3 | 4 | 5 | 6 | 7 |
|---|---|---|---|---|---|---|---|
| Additive | 0.49 | 0.47 | 0.43 | 0.40 | 0.38 | 0.33 | 0.21 |
| BuOH | 23.71 | 23.19 | 21 | 19.86 | 18.55 | 16.86 | 15 |
| MEK | 23.71 | 23.19 | 21 | 19.86 | 18.55 | 16.86 | 20 |
| Al/T | 3.23 | 5.36 | 14.29 | 18.92 | 2.46 | 8.87 | 2.5 ($TiO_2$) |
| Total content | 100 | 100 | 100 | 100 | 100 | 100 | 100 |
| Si/T (unit: parts by weight) | | | | | | | |
| toluene | N/A | | | 17.62 | 18.04 | 20.19 | |
| SS-50B | | | | 2.8 | 2.86 | 3.2 | |
| SS-50F | | | | 1.4 | 1.43 | 1.6 | |

Preparation of Coating Composition for Low Refractive Layer

Based on 100 parts by weight of trimethylolpropane triacrylate (TMPTA), 281 parts by weight of hollow silica nanoparticles (diameter: about 50 to 60 nm, density: 1.96 g/cm$^3$, JSC Catalyst and Chemicals), 63 parts by weight of solid silica nanoparticles (diameter: about 12 nm, density: 2.65 g/cm$^3$), 131 parts by weight of a first fluorine-containing compound (X-71-1203M, Shin-Etsu), 19 parts by weight of a second fluorine-containing compound (RS-537, DIC), and 31 parts by weight of an initiator (Irgacure 127, Ciba) were diluted in a mixed solvent of methyl isobutyl ketone (MIBK):diacetone alcohol (DAA):isopropyl alcohol in a weight ratio of 3:3:4 so that a solid content was 3 wt %.

Preparation of Visibility Improving Film for Display Panel

Comparative Examples 1 to 7

The coating composition of Preparation Examples 1 to 7 was coated on a TAC substrate (thickness: 80 μm) using a #8 bar, dried at 90° C. for 2 minutes and 30 seconds, and cured with a mercury lamp (at about 200 mJ/cm$^2$) to produce a visibility improving film for a display panel in which an average dry thickness of the photocurable resin layer is 5 μm.

Comparative Example 4-1

The coating composition for a low refractive layer obtained above was coated on the photocurable resin layer of the visibility improving film for a display panel prepared in Comparative Example 4 using a #4 Mayer bar so as to have a thickness of about 120 nm, and dried and cured at 90° C. for 1 minute. At the time of curing, the dried coating resultant was irradiated with UV light of 252 mJ/d under nitrogen purging, thereby preparing the visibility improving film for a display panel having a low refractive layer.

Comparative Example 8

An A25 film (LG Chem), which is an anti-glare film having a transmittance value of 90.4% as measured by JIS K 7361 and a haze value of 23.8 as measured by JIS K 7136 was prepared as a comparative example.

Examples 1 and 2

The coating composition for a low refractive layer obtained above was coated on the photocurable resin layer of the visibility improving film for display panels prepared in Comparative Examples 1 and 2 using a #4 Mayer bar so as to have a thickness of about 120 nm, and dried and cured at 90° C. for 1 minute. At the time of curing, the dried coating resultant was irradiated with UV light of 252 mJ/cm$^2$ under nitrogen purging, thereby preparing the visibility improving film for display panels having a low refractive layer.

Example 3

The coating composition for a low refractive layer obtained above was coated on the photocurable resin layer of the visibility improving film for a display panel prepared in Comparative Example 6 using a #4 Mayer bar so as to have a thickness of about 120 nm, and dried and cured at 90° C. for 1 minute. At the time of curing, the dried coating resultant was irradiated with UV light of 252 mJ/cm$^2$ under nitrogen purging, thereby preparing the visibility improving film for a display panel having a low refractive layer.

Measurement of Transmittance

The transmittance values (Tt) of the visibility improving films for display panels produced in the examples and comparative examples above were measured by a method according to JIS K 7361 using a haze meter HM-150 (Murakami).

Measurement of Haze Value

The haze values (Hz) of the visibility improving films for display panels produced in the examples and comparative examples were measured by a method according to JIS K 7136 using a haze meter HM-150 (Murakami).

Measurement of 60-Degree Gloss Value

In accordance with JIS Z 8741, the visibility improving films for display panels of the examples and comparative examples were laminated on a black acrylic plate, and the 60-degree gloss values were measured using BYK Gardner micro-tri-gloss 4520 equipment Measurement of White Turbidity Ratio The visibility improving film for a display panel of Comparative Example 8 was bonded to a glass slide (0.7 mm) using an adhesive film and placed on a black acrylic plate, and the luminance value measured at a height of 7 cm from the front side was obtained (A3), the visibility improving films for display panels of the examples and comparative examples were bonded to a glass slide by the same method, and the luminance value measured under the same conditions was obtained (B3), and then the luminance values measured in the respective examples and comparative examples were matched to calculate the white turbidity ratio.

Measurements were carried out under a condition of 9 lx. (Measuring equipment: Konica Minolta, CA-210).

Measurement of Luminance Ratio

The visibility improving film for a display panel of Comparative Example 8 was bonded to a glass slide (0.7 mm) using an adhesive film and placed on top of the LCD panel which was powered, and the luminance value measured at a height of 5.5 cm from the front side was obtained (A2), the visibility improving films for display panels of the examples and comparative examples were bonded to a glass slide by the same method, and the luminance value measured under the same conditions was obtained (B2), and then the luminance values measured in the respective examples and comparative examples were matched to calculate the luminance ratio (Measuring equipment: Konica Minolta, CA-210, LCD panel: 4.7 inches, Gray scale 255, 297.2 cd/m$^2$).

Measurements were carried out in a dark room below 3.5 lx.

Evaluation of Laser Pointer Visibility

When the visibility improving film for a display panel of Comparative Example 8 was bonded to a glass slide (0.7 mm) using an adhesive film, placed on a black acrylic plate, and then irradiated with a 535-nm laser at 45° with respect to the normal direction, the luminance value measured from the front side was obtained (A1), the visibility improving films for display panels of the examples and comparative examples were bonded to a glass slide by the same method, and the luminance value measured under the same conditions was obtained (B1), and then the luminance values measured in the respective examples and comparative examples were matched to calculate the visibility evaluation value (Measuring equipment: Konica Minolta, CA-210, laser pointer: 3M, LP-7000).

Measurements were carried out in a dark room below 3.5 lx.

Average Reflectance

The visibility improving films for display panels of the examples and comparative examples were laminated with a black PET film (product name: KUKIRIMIERU, manufactured by TOMOEGAWA) and the average reflectance was measured in the wavelength region of 380 to 780 nm using Solidspec 3700 (SHIMADZU) equipment.

The measurement results are summarized in Table 2 below.

TABLE 2

|  | Tt | Hz | 60° gloss value | White turbidity ratio |
|---|---|---|---|---|
| Comparative Example 1 | 89.3 | 4.4 | 92.9 | 1 |
| Comparative Example 2 | 87.5 | 7.4 | 92.3 | 1.67 |
| Comparative Example 3 | 79.5 | 18.5 | 91.7 | 4 |
| Comparative Example 4 | 74.2 | 26.1 | 89.4 | 5.33 |
| Comparative Example4-1 | 77 | 25.8 | 45.6 | 6 |
| Comparative Example 5 | 89.3 | 17 | 26.7 | 1.33 |
| Comparative Example 6 | 84.1 | 25.3 | 29 | 3.33 |
| Comparative Example 7 | — | — | — | 0 |
| Comparative Example 8 | 90.4 | 22.1 | 20.5 | 1 |
| Example 1 | 92.5 | 4.6 | 39.8 | 1 |
| Example 2 | 90.8 | 7.3 | 40.1 | 2 |
| Example 3 | 85.3 | 21.5 | 20.6 | 3.33 |

|  | Luminance ratio | Visibility | Average reflectance |
|---|---|---|---|
| Comparative Example 1 | 97.2 | 2.91 | 4.85 |
| Comparative Example 2 | 94.7 | 4.95 | 5.15 |
| Comparative Example 3 | 84.7 | 13.3 | 6.52 |
| Comparative Example 4 | 78.3 | 20.38 | 7.57 |
| Comparative Example4-1 | 79.7 | 22.9 | 3.7 |
| Comparative Example 5 | 97.5 | 3.23 | 4.51 |
| Comparative Example 6 | 90 | 9.6 | 5.39 |
| Comparative Example 7 | 0 | 0 | 5.64 |
| Comparative Example 8 | 100 | 1 | 4.24 |
| Example 1 | 100.4 | 3.1 | 1.29 |
| Example 2 | 97.5 | 5.5 | 1.72 |
| Example 3 | 91.8 | 10.17 | 3.28 |

Referring to Table 2 above, it can be clearly confirmed that as the visibility improving films for display panels according to the examples of the present invention include a photocurable resin layer and a low refractive layer including specific fine metal particles, they have very high transmittance values, and they have a high luminance ratio values while having relatively low gloss values as compared with the films of the comparative examples or the like, thereby enhancing the selective visibility of the laser pointer light while having excellent optical properties as a whole and having an antireflection characteristic.

The invention claimed is:

1. A visibility improving film for a display panel, comprising:
    a substrate;
    a photocurable resin layer provided on at least one side of the substrate and comprising a binder and fine metal particles with an average particle size of 0.5 to 5 μm dispersed in the binder; and
    a low refractive layer formed on the photocurable resin layer;
    wherein the fine metal particles consist of one or more metals selected from aluminum, gold, silver, magnesium, platinum, copper, titanium, zirconium, nickel, tin and chromium,
    wherein the fine metal particles have an average particle size of 0.5 to 3 μm and a flattening ratio of about 0.3 or less,
    wherein the binder comprises a photocured product of at least one selected from the group consisting of a multifunctional acrylate-based monomer, a multifunctional acrylate-based oligomer, and a multifunctional acrylate-based elastic polymer; and
    wherein the visibility improving film improves visibility of a laser pointer light on the display panel compared with a display panel without the visibility improving film and has a visibility evaluation value relative to a reference film as represented by Formula 1 of at least 3,
    an average reflectance value in a wavelength region of 380 to 780 nm is 4% or less, and a transmittance measured according to JIS K 7361 is at least 80%:

$$\text{Visibility Evaluation Value} = B1/A1 \quad \text{[Formula 1]}$$

wherein, in the Formula 1,

A1 is a luminance value measured from the front side of the reference film bonded to a glass slide, then placed on a black acrylic plate by irradiating a laser light at 45° with respect to the normal direction, the reference film having a transmittance of 70% to 100% as measured according to JIS K 7361 and a haze value of 20 to 25 as measured according to JIS K 7136, and B1 is a luminance value measured from the front side of the visibility improving film for a display panel bonded to a glass slide, then placed on a black acrylic plate by irradiating the same laser light at 45° with respect to the normal direction.

2. The visibility improving film for a display panel according to claim 1, wherein a value of luminance ratio represented by Formula 2 is 80 or more:

$$\text{Luminance Ratio} = (B2/A2)*100 \quad \text{[Formula 2]}$$

wherein, in the Formula 2,

A2 is a luminance value measured from the front side of a reference film bonded to a glass slide and then placed on a backlight surface, the reference film having a transmittance of 80% to 100% as measured according to JIS K 7361 and a haze value of 20 to 25 as measured according to JIS K 7136, and B2 is a luminance value measured from the front side of the visibility improving film for a display panel bonded to a glass slide and then placed on a backlight surface.

3. The visibility improving film for a display panel according to claim 1, wherein a white turbidity ratio value represented by Formula 3 is 5 or less:

$$\text{White Turbidity Ratio} = B3/A3 \quad \text{[Formula 3]}$$

wherein, in the Formula 3,

A3 is a luminance value ($cd/m^2$) measured at a height of 7 cm from the front side of a reference film bonded to a glass slide, then placed on a black acrylic plate and kept under the condition of 9 lx, the reference film having a transmittance of 80% to 100% as measured according to JIS K 7361 and a haze value of 20 to 25 as measured according to JIS K 7136 is, and B3 is a luminance value ($cd/m^2$) measured at a height of 7 cm from the front side of the visibility improving film for a display panel bonded to a glass slide, then placed on a black acrylic plate and kept under the condition of 9 lx.

4. The visibility improving film for a display panel according to claim 1, wherein the visibility improving film has a 60(d) gloss value measured according to JIS Z 8741 of 10 to 50.

5. The visibility improving film for a display panel according to claim 1, wherein the fine metal particles are contained in an amount of 0.5 to 10 parts by weight, based on 100 parts by weight of the binder.

6. The visibility improving film for a display panel according to claim 1, wherein the low refractive layer is formed from a coating composition for a low refractive layer comprising:

a photopolymerizable compound; and any one or more fluorine-containing compounds containing a photoreactive group, and a silicon-based compound containing a photoreactive group, wherein the low refractive layer has an average reflectance value in the wavelength range of 380 to 780 nm of 4% or less.

7. The visibility improving film for a display panel according to claim 1, wherein the photocurable resin layer further includes silica fine particles having an average particle size of 0.5 to 5 μm.

8. The visibility improving film for a display panel according to claim 1, the visibility improving film has a pencil hardness of HB or more at a load of 500 g.

9. The visibility improving film for a display panel according to claim 1, wherein the substrate includes at least one material selected from glass, polyethylene terephthalate (PET), ethylene vinyl acetate (EVA), a cyclic olefin polymer (COP), a cyclic olefin copolymer (COC), polyacrylate (PAC), polycarbonate (PC), polyethylene (PE), poly(methylmethacrylate) (PMMA), polyether ether ketone (PEEK), polyethylene naphthalate (PEN), polyetherimide (PEI), polyimide (PI), MMA (methyl methacrylate), a fluorocarbon resin, and triacetylcellulose (TAC).

10. A display device comprising a display panel and the visibility improving film for a display panel of claim 1 on the display panel.

11. A display panel comprising the visibility improving film for a display panel of claim 1.

* * * * *